United States Patent
Liano et al.

(10) Patent No.: US 11,410,478 B2
(45) Date of Patent: Aug. 9, 2022

(54) VISUALIZATION AND MANAGEMENT OF ACCESS LEVELS FOR ACCESS CONTROL BASED AL HIERARCHY

(71) Applicant: Carrier Corporation, Palm Beach Gardens, FL (US)

(72) Inventors: Blanca Florentino Liano, Cork (IE); Ankit Tiwari, South Windsor, CT (US); Jakub Potocki, Cork (IE); Ed Gauthier, Fairport, NY (US); John Marchioli, Fairport, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/048,363

(22) PCT Filed: Apr. 17, 2019

(86) PCT No.: PCT/US2019/027867
§ 371 (c)(1),
(2) Date: Oct. 16, 2020

(87) PCT Pub. No.: WO2019/204435
PCT Pub. Date: Oct. 24, 2019

(65) Prior Publication Data
US 2021/0150835 A1 May 20, 2021

Related U.S. Application Data

(60) Provisional application No. 62/659,409, filed on Apr. 18, 2018.

(51) Int. Cl.
*G06F 21/62* (2013.01)
*G07C 9/00* (2020.01)
(Continued)

(52) U.S. Cl.
CPC ........ *G07C 9/00309* (2013.01); *G07C 9/27* (2020.01); *H04L 63/105* (2013.01);
(Continued)

(58) Field of Classification Search
CPC .......... G07C 2209/04; G07C 9/00309; G07C 9/00904; G07C 9/27; G07C 9/00896;
(Continued)

(56) References Cited

U.S. PATENT DOCUMENTS

| | | |
|---|---|---|
| 4,148,012 A | 4/1979 | Baump et al. |
| 4,532,507 A | 7/1985 | Edson et al. |

(Continued)

FOREIGN PATENT DOCUMENTS

| | | | |
|---|---|---|---|
| CA | 2439722 A1 | 4/2005 | |
| WO | WO-0203215 A1 * | 1/2002 | ......... G06F 21/6218 |

(Continued)

OTHER PUBLICATIONS

Notification of Transmittal of the International Search Report for International Application No. PCT/US2019/027867 dated Jul. 10, 2019; Report Received Date: Jul. 19, 2019; 6 pages.

(Continued)

*Primary Examiner* — Dionne Pendleton
(74) *Attorney, Agent, or Firm* — Cantor Colburn LLP

(57) ABSTRACT

A method of operating an access control system containing one or more hierarchies, each of the one or more hierarchies includes one or more access levels is provided. The method including: computing one or more hierarchies; and assigning a primary access level of the one or more access levels within a primary hierarchy of the one or more hierarchies to a first credential; and determining that access levels vertically below the primary access level in the primary hierarchy are implicitly assigned to the first credential when assigning the primary access level of the one or more access (Continued)

levels within the primary hierarchy of the one or more hierarchies to the first credential.

18 Claims, 3 Drawing Sheets

(51) Int. Cl.
*H04L 9/40* (2022.01)
*G07C 9/27* (2020.01)

(52) U.S. Cl.
CPC .......... *G06F 2221/2113* (2013.01); *G06F 2221/2141* (2013.01); *G07C 2209/04* (2013.01)

(58) Field of Classification Search
CPC ..... G07C 9/00944; G07C 9/22; H04L 63/105; H04L 2209/38; H04L 2209/56; H04L 2209/80; H04L 63/101; H04L 63/104; H04L 63/107; H04L 9/0637; H04L 9/0822; H04L 9/0825; H04L 9/085; H04L 9/0897; H04L 9/14; H04L 9/3073; H04L 9/3226; H04L 9/3239; H04L 9/3247; H04L 9/3271; H04W 12/08; H04K 2203/18; H04K 2203/22; H04K 3/22; H04K 3/25; H04K 3/90; H04K 3/92; H04B 1/3827; G07B 15/00; G08G 5/0013; G08G 5/0039; G08G 5/006; G08G 5/0069; G06Q 20/065; G06Q 20/102; G06Q 20/3829; G06Q 20/401; G06Q 2220/00; G06Q 2240/00; G05D 1/102; G05D 1/106; G01C 21/20; G06F 2221/2113; G06F 21/6209; G06F 21/6218; G06F 2221/2147; G06F 21/602; G06F 21/606; G06F 2221/2111; G06F 2221/2141; G06F 3/0622; G06F 3/0637; G06F 3/0673; B64C 39/024

See application file for complete search history.

(56) References Cited

U.S. PATENT DOCUMENTS

| | | | |
|---|---|---|---|
| 7,861,314 | B2 | 12/2010 | Serani et al. |
| 8,234,704 | B2 | 7/2012 | Ghai et al. |
| 9,111,088 | B2 | 8/2015 | Ghai et al. |
| 9,264,449 | B1 | 2/2016 | Roth et al. |
| 2006/0137026 | A1 | 6/2006 | Serani et al. |
| 2007/0008142 | A1 | 1/2007 | Crowe et al. |
| 2007/0172744 | A1 | 11/2007 | Bantwal et al. |
| 2010/0269156 | A1 | 10/2010 | Hohlfeld et al. |
| 2015/0206361 | A1 | 7/2015 | Chen et al. |
| 2015/0206363 | A1 | 7/2015 | Tevyowitz |
| 2015/0281287 | A1 | 10/2015 | Gill et al. |
| 2016/0117917 | A1 | 4/2016 | Prakash et al. |
| 2016/0248748 | A1 | 8/2016 | Caterino et al. |
| 2016/0253907 | A1* | 9/2016 | Taveira .......... G07B 15/00 701/3 |
| 2017/0132859 | A1 | 5/2017 | Troncoso |
| 2017/0228953 | A1* | 8/2017 | Lupovici .......... G07C 9/00896 |
| 2017/0293769 | A1* | 10/2017 | Quinlan .......... G06F 3/0622 |

FOREIGN PATENT DOCUMENTS

| | | |
|---|---|---|
| WO | 2015099607 A1 | 7/2015 |
| WO | 2016019474 A1 | 2/2016 |

OTHER PUBLICATIONS

Written Opinion of the International Searching Authority for International Application No. PCT/US2019/027867; dated Jul. 10, 2019; Report Received Date: Jul. 19, 2019; 8 pages.

\* cited by examiner

VISUALIZATION AND MANAGEMENT OF ACCESS LEVELS FOR ACCESS CONTROL BASED AL HIERARCHY

CROSS-REFERENCE TO RELATED APPLICATIONS

This application is a National Stage Application of International Application No. PCT/US2019/027867 filed Apr. 17, 2019, which claims the benefit of 62/659,409 filed Apr. 18, 2018, the disclosures of which are incorporated herein by reference in their entirety.

BACKGROUND

The subject matter disclosed herein generally relates to the field of access control systems, and more particularly to an apparatus and method for operating access control systems.

Physical access control systems (PACS) prevent unauthorized individuals access protected to areas. Individuals who have a credential (e.g., card, badge, RFID card, FOB, or mobile device) present it at an access point (e.g., swipe a card at a reader) and the PACS makes an almost immediate decision whether to grant them access (e.g., unlock the door). The decision is usually computed at a controller by checking a permissions database to ascertain whether there is a static permission linked to requester's credential. If the permission(s) are correct, the PACS unlocks the door as requested providing the requestor access. Typically, with static permissions, such a request for access can be made at a given time of the day and access will be granted. In standard deployment of a PACS, a permission(s) database is maintained at a central server and relevant parts of the permissions database are downloaded to individual controllers that control the locks at the doors.

Maintaining the correct list of permissions for each cardholder is done through access administration process and can be complex, time consuming and prone to errors. In addition, the database of permissions can be large especially as the scale of an enterprise grows large. Such large databases can consume significant amounts of memory on a controller. Moreover, because of the size of the database, it can be very time consuming to update controllers by downloading databases from the central server to controllers every time there is a change in any permission(s), credential, controller, or users. Such deployments therefore require more costly installations, by either installing more powerful controllers or larger number of controllers.

In order to simplify administration, the permissions are often organized into groups and roles which are sometimes called "Access Levels". Administrators then assign groups of permissions i.e. "Access Levels" to cardholder credentials which simplifies administration. An "Access Level" is a list of tuples (reader, time zone), that specifies which readers (doors) and when (time of the day and day of the week) the cardholder who is assigned to the access level can access them. The number of created access levels grow over time and their definition often overlaps, which makes it difficult for administrators to understand what access levels should be assigned to new cardholders as several of them may contain the targeted readers and time zones. This can often result in over assignment of permissions i.e. giving access to doors/readers that are not required but part of the Assigned Access Levels or even under assignment in certain cases. Furthermore, PACS administration modules do not provide easy means for analyzing/visualizing the access level relationship that can lead to creation of redundant and unintended assignment of permissions.

BRIEF SUMMARY

According to one embodiment, a method of operating an access control system containing one or more hierarchies, each of the one or more hierarchies includes one or more access levels is provided. The method including: computing one or more hierarchies; and assigning a primary access level of the one or more access levels within a primary hierarchy of the one or more hierarchies to a first credential; and determining that access levels vertically below the primary access level in the primary hierarchy are implicitly assigned to the first credential when assigning the primary access level of the one or more access levels within the primary hierarchy of the one or more hierarchies to the first credential.

In addition to one or more of the features described above, or as an alternative, further embodiments may include that computing one or more hierarchies further includes at least one of: removing duplicate access levels within each of the one or more hierarchies; removing unassigned access levels within each of the one or more hierarchies; removing redundant access levels across each of the one or more hierarchies; combining two or more access levels within a hierarchy if the access levels are always assigned together within the hierarchy; and splitting over assigned access levels within each of the one or more hierarchies.

In addition to one or more of the features described above, or as an alternative, further embodiments may include: receiving an access request at a first access control, the access request including the first credential; determining which access levels are assigned to the first credential; determining that at least one access level assigned to the first credential is authorized to actuate the first access control; and actuating the first access control when it has been determined that credentials are authorized to actuate the first access control.

In addition to one or more of the features described above, or as an alternative, further embodiments may include: receiving an access request at a first access control, the access request including the first credential; determining which access levels are assigned to the first credential; determining that none of the access levels assigned to the first credentials are not authorized to actuate the first access control; and maintaining the access control in a non-actuated position.

In addition to one or more of the features described above, or as an alternative, further embodiments may include that the first access control is a door lock operably connected to a door and actuating the first access control unlocks the door.

In addition to one or more of the features described above, or as an alternative, further embodiments may include: identifying access levels proximate a vertical top portion of each of the one or more hierarchies.

In addition to one or more of the features described above, or as an alternative, further embodiments may include: identifying groups of credentials that are assigned to one or more access levels proximate a vertical top portion of one or more hierarchies.

In addition to one or more of the features described above, or as an alternative, further embodiments may include: identifying sensitive access levels in each of the one or more hierarchies; and prioritizing the sensitive access levels for defining and enforcing access level policies.

In addition to one or more of the features described above, or as an alternative, further embodiments may include: detecting usage of access controls at each of the one or more access levels for each of the one or more hierarchies; and recommending removal of access levels from a credential located proximate a vertical top portion each of the one or more hierarchies in response to usage by the credential.

In addition to one or more of the features described above, or as an alternative, further embodiments may include: splitting an access level located proximate a vertical top portion of a hierarchy into multiple access levels each having a limited number of access controls.

In addition to one or more of the features described above, or as an alternative, further embodiments may include: recommending an access level proximate a vertical bottom portion of a hierarchy for a new credential.

According to another embodiment, a computer program product tangibly embodied on a computer readable medium is provided. The computer program product including instructions that, when executed by a processor, cause the processor to perform operations including: computing one or more hierarchies; assigning a primary access level of the one or more access levels within a primary hierarchy of the one or more hierarchies to a first credential; and determining that access levels vertically below the primary access level in the primary hierarchy are implicitly assigned to the first credential when assigning the primary access level of the one or more access levels within the primary hierarchy of the one or more hierarchies to the first credential.

In addition to one or more of the features described above, or as an alternative, further embodiments may include that computing one or more hierarchies further includes at least one of: removing duplicate access levels within each of the one or more hierarchies; removing unassigned access levels within each of the one or more hierarchies; removing redundant access levels across each of the one or more hierarchies; combining two or more access levels within a hierarchy if the access levels are always assigned together within the hierarchy; and splitting over assigned access levels within each of the one or more hierarchies.

In addition to one or more of the features described above, or as an alternative, further embodiments may include that the operations further include: receiving an access request at a first access control, the access request including the first credential; determining which access levels are assigned to the first credential; determining that at least one access level assigned to the first credential is authorized to actuate the first access control; and actuating the first access control when it has been determined that credentials are authorized to actuate the first access control.

In addition to one or more of the features described above, or as an alternative, further embodiments may include that the operations further include: receiving an access request at a first access control, the access request including the first credential; determining which access levels are assigned to the first credential; determining that none of the access levels assigned to the first credential are not authorized to actuate the first access control; and maintaining the access control in a non-actuated position.

In addition to one or more of the features described above, or as an alternative, further embodiments may include that the first access control is a door lock operably connected to a door and actuating the first access control unlocks the door.

In addition to one or more of the features described above, or as an alternative, further embodiments may include that the operations further include: identifying access levels proximate a vertical top portion of each of the one or more hierarchies.

In addition to one or more of the features described above, or as an alternative, further embodiments may include that the operations further include: identifying groups of credentials that are assigned to one or more access levels proximate a vertical top portion of one or more hierarchies.

In addition to one or more of the features described above, or as an alternative, further embodiments may include that the operations further include: identifying sensitive access levels in each of the one or more hierarchies; and prioritizing the sensitive access levels for defining and enforcing access level policies.

In addition to one or more of the features described above, or as an alternative, further embodiments may include that the operations further include: detecting usage of access controls at each of the one or more access levels for each of the one or more hierarchies; and recommending removal of access levels from a credential located proximate a vertical top portion each of the one or more hierarchies in response to usage by the credential.

Technical effects of embodiments of the present disclosure include organizing access levels for access controls on a hierarchy basis.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
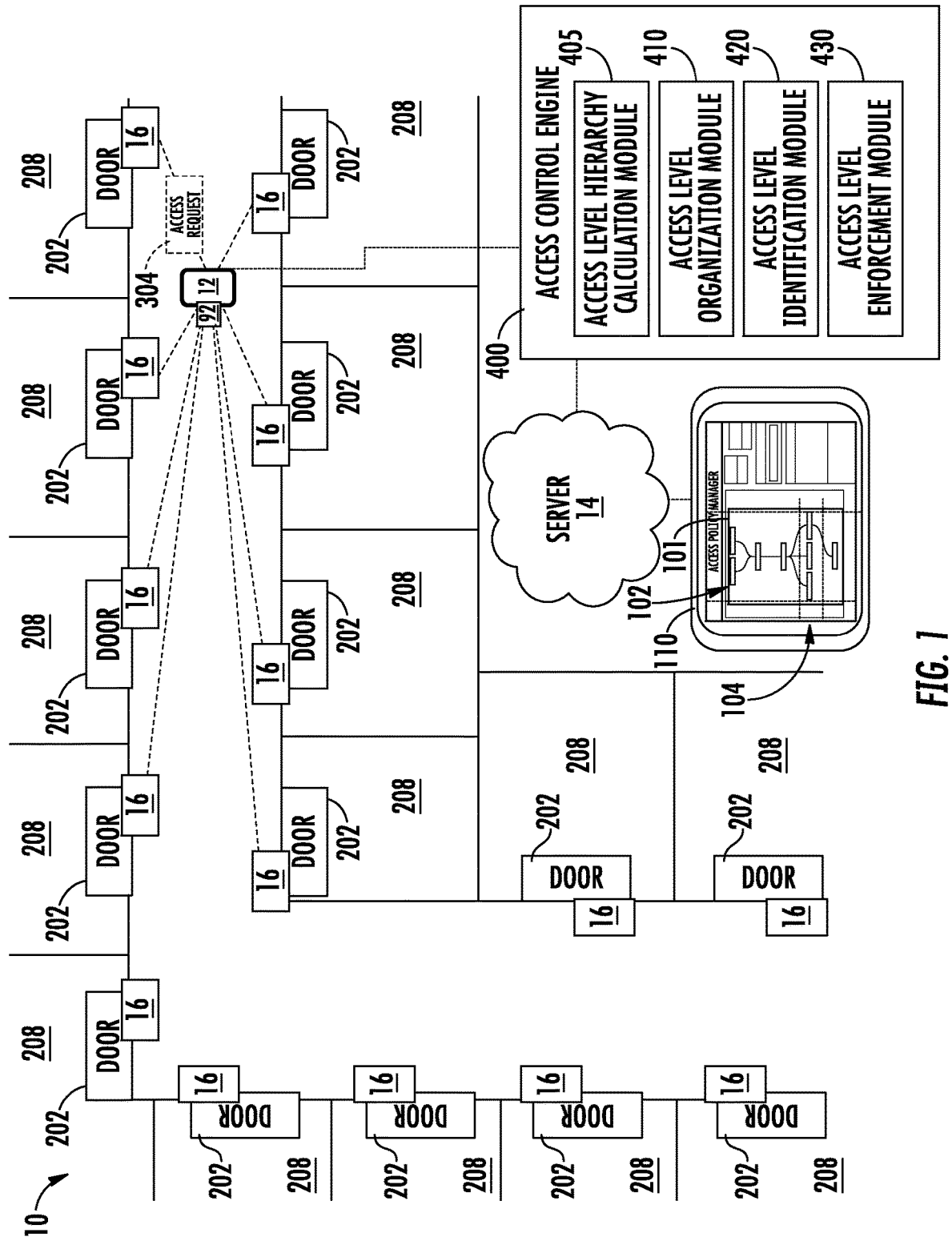
FIG. 1 illustrates a general schematic system diagram of an access control system, in accordance with an embodiment of the disclosure.

FIG. 1 schematically illustrates an access control system 10. The system 10 generally includes an access card 92 (e.g., MiFare, iClass, Prox, etc.) or a mobile device 12, an access control panel, a server 14, and an access control, which consists of a card or Bluetooth reader, a door actuator or strike 16. The access control system 10 may include any number of access controls 16. It should be appreciated that, although particular systems are separately defined in the schematic block diagrams, each or any of the systems may be otherwise combined or separated via hardware and/or software. In the illustrated embodiment, the access controls 16 may control access through a door 202 to a room or a common area like lobby, building perimeter, etc. 208. The access control system 10 may include any number of doors 202 and rooms 208. Further, there may be multiple doors 202 and access controls 16 for each room 208. It is understood that while the access control system 10 utilizes a door 202 and room 208 system for exemplary illustration, embodiments disclosed herein may be applied to other access control systems such as, for example, elevators, turnstiles, safes, etc.

A mobile device 12 or an access card 92 belonging to an individual may be granted access to one or more access controls 16 (e.g. the lobby access of enterprise building, the lab access in an office, the door lock on an office or hotel room assigned to the individual). Commonly, access is granted on a case-by-case basis for each access control 16 individually. Embodiments disclosed herein seek to simplify and organize granting access to multiple access controls by organizing access levels 104 into a hierarchy 102 of access levels 104. The access control system 10 may contain one or more hierarchies 102 each having one or more access levels 104, as discussed further below. Commonly, in one example, when an individual begins working at a new building they will assigned access credentials that can be coded onto access a card given to them or downloaded to their mobile device 12. The access credential will be granted access to particular areas or rooms 208 where they are allowed to enter and/or work. In another example, when an individual checks into the hotel room their mobile device 12 will be granted access to a room 208. There may be one or more mobile devices 12 assigned to a room 208 (e.g. a husband and a wife in a hotel; or multiple workers in a collaborative workspace), thus embodiments disclosed herein may apply to multiple mobile devices 12 per room 208. An individual may utilize their mobile device 12 to unlock and/or lock the access control 16 operably connected to their assigned room 208 through an access request 304. The mobile device 12 may store credentials to unlock and/or lock the access control 16. Some credentials may be used for multiple access controls 16 if there are multiple access controls 16 for a single assigned room 208 or the individual is assigned access to multiple rooms 208. For example, an access control 16 operably connected to an individual's hotel room and an access control 16 operably connected to a hotel pool may respond to the same credential. Other credentials may be specific to a single access control 16.

Wireless communication may occur between the access control 16 and the mobile device 12 or an access card 92 via short range wireless communication, such as for example RFID, Wi-Fi, Bluetooth, ZigBee, infrared, or any other short-range wireless communication method known to one of skill in the art. In an embodiment, the short-range wireless communication is Bluetooth. The mobile device 12 may have to be within a selected range of the access control 16 in order to utilize short-range wireless communication.

Each access control 16 is a wireless-capable, restricted-access, or restricted-use device such as wireless locks, access control readers for building entry, and other restricted-use machines. The mobile device 12 or access card 92 submits credentials to the access controls 16, thereby selectively permitting a user to actuate (i.e., access or activate) functions of the access controls 16. A user may, for example, submit a credential to an electromechanical lock to unlock it, and thereby gain access to a room 208.

The mobile device 12 or access card 92 may transmit an access request 304 to the access control 16 by short-range radio transmission when the mobile device 12 is placed proximate the access control 16. The mobile device 12 is a wireless capable handheld device such as a smartphone that is operable to communicate with the server 14 and the access controls 16. The server 14 may provide credentials and other data to the access control 16, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data. The access controls 16 may communicate directly with the server 14.

The system 10 also includes an administrator device 110 through which an administrator may manage access levels 104 of each credential for access to one or more access controls 16. The administrator device 110 may be a computing device such as a desktop computer. The administrator device 110 may also be a mobile computing device that is typically carried by a person, such as, for example a phone, PDA, smart watch, tablet, laptop, etc. The administrator device 110 may also be two separate devices that are synced together such as, for example, a cellular phone and a desktop computer synced over an internet connection. The administrator device 110 allows an administrator to interact with an access control engine 400 in order to manage the access level 104 of each credential for access to one or more access controls 16. Each access level 104 includes one or more access control 16. An Access level may be a set of access controls 16 and/or time zone tuples (e.g., $AL=\{(R_1,TZ_1), (R_2,TZ_1), (R_3,TZ_2) \ldots \}$; AL=Access level, R=Access control, TZ=time zone). The time zone specifies when the credential can access the access control 16. For example, a time zone with name business hours allows access from Monday to Friday from 7:00 am to 7:00 pm.

If a credential is granted access to an access level 104, then the credential may access all of the access controls 16 in the access level 104. A credential may be granted access to different access levels 104 across multiple access hierarchies 102 in an access level hierarchical system 101. An Access Level hierarchy system is an organization of the access levels 104 defined in an access control system 10 in which access levels 104 are ranked in an access level hierarchy 102 (i.e., one above the other) according to a containment relationship. For example, if AL1 is define as $AL_1=\{(R_1,TZ_1),(R_2, TZ_1)\}$ and $AL_2=\{(R_1,TZ_2),(R_2, TZ_2)\}$ being $TZ_1=\{$Mon-Fri, 7 am-7 pm$\}$ and $TZ_2=\{$Mon-Sun, 00 am-12 pm$\}$ then $AL_2$ is above $AL_1$ in the hierarchy. Another example would be $AL_3=\{(R_1,TZ_1),(R_2, TZ_1), (R_3, TZ_1)\}$, $AL_4=\{(R_1,TZ_1),(R_2, TZ_1), (R_3, TZ_1), (R_4, TZ_1)\}$ then $AL_4$ is above $AL_3$.

The access levels 104 are organized in an access level hierarchical system 101 stretch from a top of the access level hierarchy 102 to a bottom of the access level hierarchy 102. If a credential is granted access to an access level 104, the credential is implicitly granted access to ever other access level below that access level 104 in the hierarchy 102. For example, if a credential is granted access/assigned to the top access level 104 of a hierarchy 102, they are implicitly granted access/assigned to all access level 104 below the top access level 104 within the hierarchy.

The access control engine 400 is comprised of modules including; an access level hierarchy calculation module 405, an access level organizational module 410; an access level identification module 420; and an access level enforcement module 430. Each module 405, 410, 420, 430 may be located on either the mobile device 12, administrator device 110, or the server 14. Alternatively, the modules 405, 410, 420, 430 may be distributed between the mobile device 12, administrator device 110, and the server 14.

The access level hierarchy calculation module 405 is configured to compute access level hierarchy(s) 102 of the access level hierarchy system 101 by finding containment relationships among the access levels 104 based on their definition.

The access level organizational module 410 is configured, based on the hierarchy computed on the access level hierarchy calculation module 405, to remove duplicate access levels 104 (access levels with same definition) and unassigned access levels 104 (access levels that are not assigned to any credential) from the access control system, and to remove redundant access levels 104 from credentials (e.g., if a credential is granted to two access levels ($AL_1$ and $AL_2$) and $AL_2$ is above the hierarchy of the $AL_1$, then $AL_1$ is redundant since $AL_2$ is a superset of $AL_1$). The access level organizational module 410 is also configured to combine access levels 104 at same hierarchy 102 if they are always assigned together and split access levels 104 to prevent over assignment of privileges.

The access level identification module 420 is configured, based on the hierarchy computed on the access level hierarchy calculation module 405, to identify access levels 104 higher up in the access level hierarchy 102 that also have deep pervasive roots in the access level hierarchy 102. These access levels 104 may be market as important or sensitive for close review due to the breadth of access that may be given in the access level 104. The access level identification module 420 is also configured to identify credential attributes and groups that are assigned with several important access levels 104 and across multiple hierarchies 102 hierarchies The access level enforcement module 430 is configured, based on the hierarchy computed on the access level hierarchy calculation module 405, to prioritize sensitive access levels 104 for defining and enforcing access level policies. The access level enforcement module 430 is also configured to recommend removal of higher-hierarchy access levels 104 based on actual usage from population with certain attributes, split higher hierarchy access levels 104 into multiple access levels 104 with limited readers or recommend access levels 104 with least privilege based on required access for a new credential holder.

Figure 2:
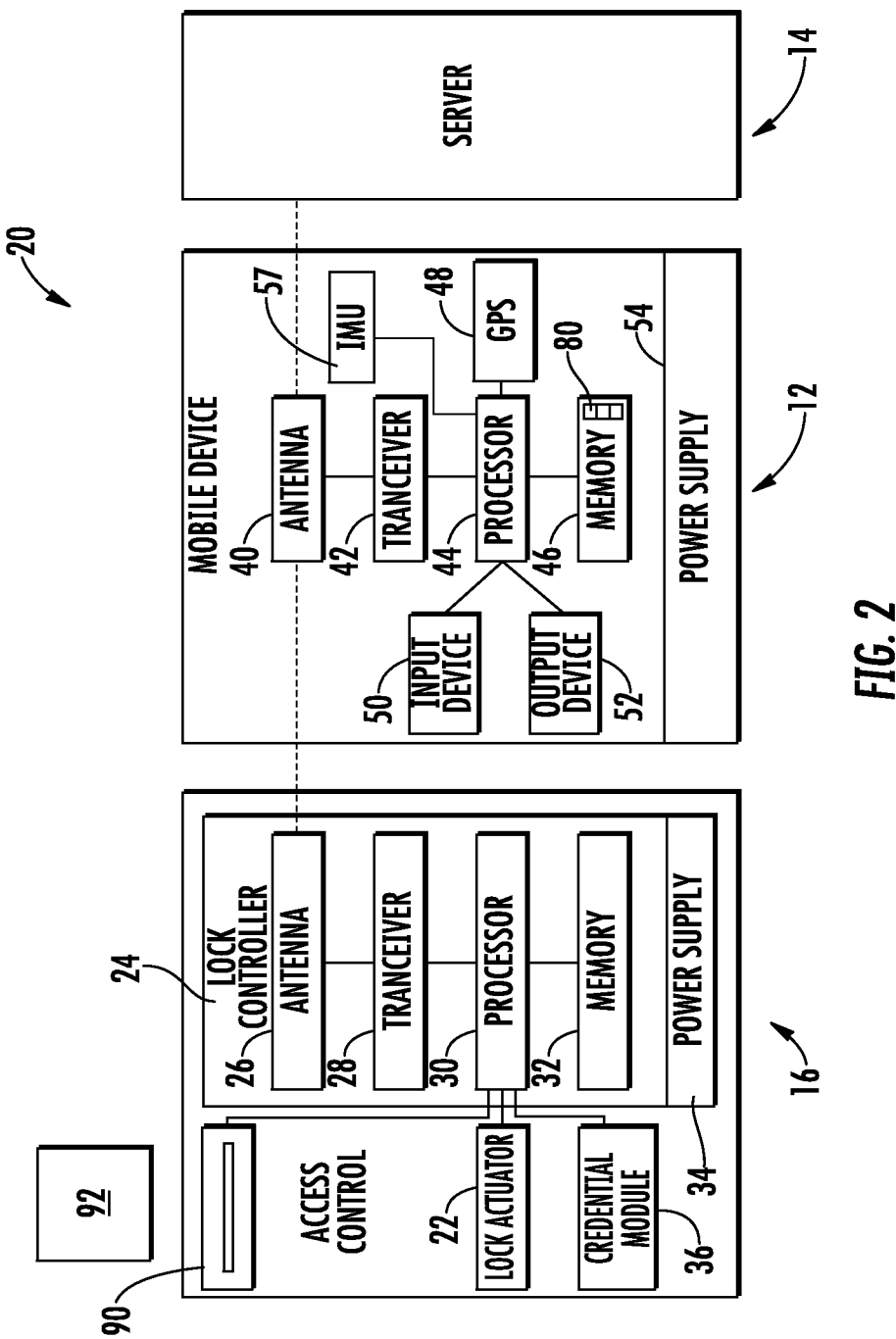
FIG. 2 illustrates a block diagram of an access control, mobile device and server of the access control system of FIG. 1, in accordance with an embodiment of the disclosure.

Referring now to FIG. 2 with continued reference to FIG. 1. FIG. 2 shows a block diagram of an example electronic lock system 20 includes the access control 16, the mobile device 12, and the server 14. The access control 16 generally includes a lock actuator 22, a lock controller 24, a lock antenna 26, a lock transceiver 28, a lock processor 30, a lock memory 32, a lock power supply 34, a lock card reader 90, and a credential module 36.

The access control 16 may have essentially two readers, one reader 90 to read a physical key card 92 and the credential module 36 to communicate with the mobile device 12 via the lock processor 30 and the transceiver 28 and antenna 26. In addition to utilizing the mobile device 12 to actuator the access control 16, a physical key card 92 may also be used to actuate the access control 16 by being inserted into the access control 16 for the access control 16 to read the physical key card 92 (e.g. a magnetic strip on an encoded card 92). The physical key card 92 is capable of being encoded with card data, such as, for example, a magnetic strip or RFID chip. The card data may include credentials to grant access to a specific access control 16. For example, for a period the mobile device 12 may be granted access to a specific access control 16, such as, for example, a period of stay/employment for the individual possessing the mobile device 12.

The access control 16 is responsive to credentials from the mobile device 12, and may, for example, be the lock of a turnstile or a door lock. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, infrared, ZigBee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, a key power supply 54, and an IMU sensor 57. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The IMU sensor 57 may be a sensor such as, for example, an accelerometer, a gyroscope, or a similar sensor known to one of skill in the art.

Figure 3:
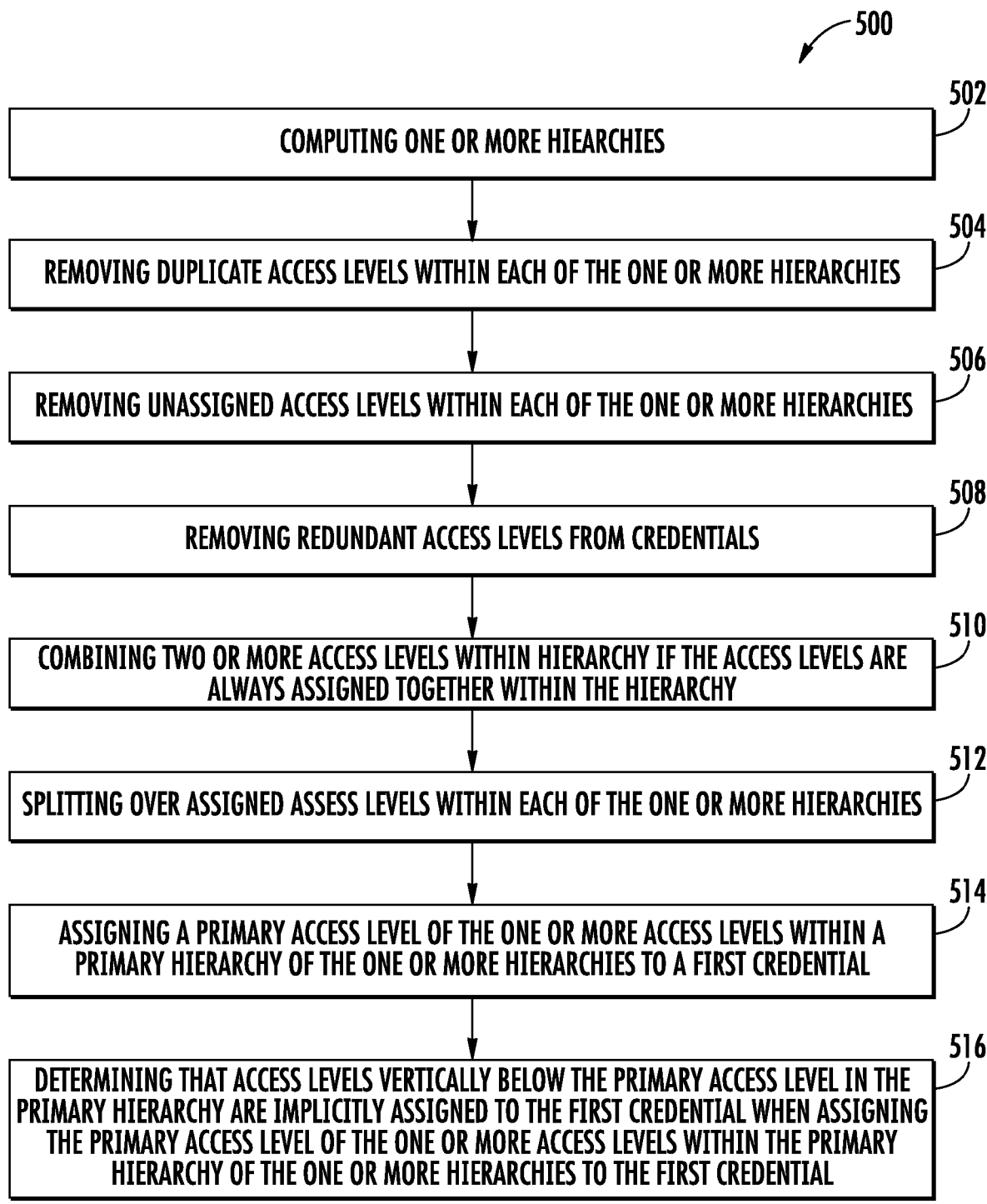
FIG. 3 is a flow diagram illustrating a method of operating an access control system, according to an embodiment of the present disclosure.

Referring now to FIG. 3 with continued reference to FIGS. 1-2. FIG. 3 shows a flow chart of a method 500 of operating an access control system 10. The method 500 may be performed by the mobile device 12, the administrator device 110, and/or the server 14. At block 502, access levels hierarchies 102 are computed. Block 502 may include at least one of blocks 504, 506, 508, 510, and 512. At block 504, duplicate access levels 104 are removed within each of the one or more hierarchies 102. At block 506, unassigned access levels 104 are removed within each of the one or more hierarchies 102. At block 508, redundant access levels 104 are removed from credentials. At block 510, two or more access levels 104 within a hierarchy 102 are combined if the access levels 104 are always assigned together within the hierarchy 102. At block 512, over assigned access levels 104 are split within each of the one or more hierarchies 104.

At block 514, a primary access level 104 of the one or more access levels 104 within a primary hierarchy 102 of the one or more hierarchies 102 is assigned to a first credential. When the primary access level 104 is granted access to access controls 16 within the primary access level 104, it is determined that implicit access is given to all access controls 16 within access levels 104 vertically below the primary access level 104 in the primary hierarchy 102, at block 516. When an access request including the first credential is received at a first access control 16, it is determined whether the first credential has assigned the primary access level 104. Access levels 104 are assigned credentials on key cards 92 or mobile device. A credential is authorized to actuate (open) an access control 16 (readers) if the credential has assigned an Access Level which contains the access control in its definition. For example, if it is determined which access levels 104 are assigned to the first credential and at least one access level 104 assigned to the first credential is authorized to actuate the first access control 16, then the access control 16 is actuated (e.g., the door lock get unlocked). In another example, if it is determined which access levels 104 are assigned to the first credential and none of the access levels 104 assigned to the first credential are authorized to actuate the first access control 16, then the access control 16 remains in a non-actuated position (e.g., the door lock remains locked). In an embodiment the access control 16 is a door lock operably connected to a door and actuating the access control 16 unlocks the door 202.

The method 500 may further include: identifying access levels 104 proximate a vertical top portion of each of the one or more hierarchies 102, which may be marked for increased monitoring due to their increased access.

The method 500 may further include: identifying groups of credentials that are assigned to one or more access levels 104 proximate a vertical top portion of one or more hierarchies 102, which may ensure higher level policy requirements. Higher level policy requirements include identification of the access levels higher up in the hierarchy 102, allows the system administrator to set up policies for the sensitive access levels 104 or access levels 104 which imply greater access.

The method 500 may further include: identifying sensitive access levels 104 in each of the one or more hierarchies 102; and prioritizing the sensitive access levels 104 for defining and enforcing access level policies. Advantageously, individuals with access to sensitive access levels 104 much be closely monitored and regulated.

The method 500 may further include: detecting usage of access controls 16 at each of the one or more access levels 104 for each of the one or more hierarchies 102; and recommending removal of access levels 104 from a credential located proximate a vertical top portion each of the one or more hierarchies 102 in response to usage by the credential. For example, if an individual has access to an access level 104 in a vertical top portion of a hierarchy 102 but never uses it they may no longer need it. Additionally, an access level 104 located proximate a vertical top portion of a hierarchy (i.e. high-level access level) may be split into multiple access levels 104 each having a limited number of access controls 16. Advantageously, the method 500 creates improved maintainability of the access control system 10 by removing unnecessary access levels 104. The method 500 may further include: recommending an access level 104 proximate a vertical bottom portion of a hierarchy 102 for a new credential.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodi-

What is claimed is:

1. A method of operating an access control system containing one or more hierarchies, each of the one or more hierarchies includes one or more access levels, the method comprising:
computing one or more hierarchies; and
assigning a primary access level of the one or more access levels within a primary hierarchy of the one or more hierarchies to a first credential; and
determining that access levels vertically below the primary access level in the primary hierarchy are implicitly assigned to the first credential when assigning the primary access level of the one or more access levels within the primary hierarchy of the one or more hierarchies to the first credential,
wherein the method further comprises at least one of:
(1) identifying sensitive access levels in each of the one or more hierarchies, and
prioritizing the sensitive access levels for defining and enforcing access level policies, or
(2) splitting an access level located proximate a vertical top portion of a hierarchy into multiple access levels each having a limited number of access controls.

2. The method of claim 1, wherein computing one or more hierarchies further comprises at least one of:
removing duplicate access levels within each of the one or more hierarchies;
removing unassigned access levels within each of the one or more hierarchies;
removing redundant access levels across each of the one or more hierarchies;
combining two or more access levels within a hierarchy if the access levels are always assigned together within the hierarchy; and
splitting over assigned access levels within each of the one or more hierarchies.

3. The method of claim 1, further comprising:
receiving an access request at a first access control, the access request including the first credential;
determining which access levels are assigned to the first credential;
determining that at least one access level assigned to the first credential is authorized to actuate the first access control; and
actuating the first access control when it has been determined that credentials are authorized to actuate the first access control.

4. The method of claim 3, wherein the first access control is a door lock operably connected to a door and actuating the first access control unlocks the door.

5. The method of claim 1, further comprising:
receiving an access request at a first access control, the access request including the first credential;
determining which access levels are assigned to the first credential;
determining that none of the access levels assigned to the first credential are not authorized to actuate the first access control; and
maintaining the access control in a non-actuated position.

6. The method of claim 1, further comprising:
identifying access levels proximate a vertical top portion of each of the one or more hierarchies.

7. The method of claim 1, further comprising:
identifying groups of credentials that are assigned to one or more access levels proximate a vertical top portion of one or more hierarchies.

8. The method of claim 1, further comprising:
detecting usage of access controls at each of the one or more access levels for each of the one or more hierarchies; and
recommending removal of access levels from a credential located proximate a vertical top portion each of the one or more hierarchies in response to usage by the credential.

9. The method of claim 1, further comprising:
recommending an access level proximate a vertical bottom portion of a hierarchy for a new credential.

10. A computer program product tangibly embodied on a computer readable medium, the computer program product including instructions that, when executed by a processor, cause the processor to perform operations comprising:
computing one or more hierarchies;
assigning a primary access level of the one or more access levels within a primary hierarchy of the one or more hierarchies to a first credential; and
determining that access levels vertically below the primary access level in the primary hierarchy are implicitly assigned to the first credential when assigning the primary access level of the one or more access levels within the primary hierarchy of the one or more hierarchies to the first credential,
wherein the operations further comprise at least one of:
(1) identifying sensitive levels in each of the one or more hierarchies; and
prioritizing the sensitive access levels for defining and enforcing access level policies, or
(2) splitting an access level located proximate a vertical top portion of a hierarchy into multiple access levels each having a limited number of access controls.

11. The computer product of claim 10, wherein computing one or more hierarchies further comprises at least one of:
removing duplicate access levels within each of the one or more hierarchies;
removing unassigned access levels within each of the one or more hierarchies;
removing redundant access levels across each of the one or more hierarchies;
combining two or more access levels within a hierarchy if the access levels are always assigned together within the hierarchy; and
splitting over assigned access levels within each of the one or more hierarchies.

12. The computer product of claim 10, wherein the operations further comprise:
receiving an access request at a first access control, the access request including the first credential;
determining which access levels are assigned to the first credential;
determining that at least one access level assigned to the first credential are authorized to actuate the first access control; and
actuating the first access control when it has been determined that credentials are authorized to actuate the first access control.

13. The computer product of claim 12, wherein the first access control is a door lock operably connected to a door and actuating the first access control unlocks the door.

14. The computer product of claim 10, wherein the operations further comprise:

receiving an access request at a first access control, the access request including the first credential;

determining which access levels are assigned to the first credential;

determining that none of the access levels assigned to the first credential are not authorized to actuate the first access control; and maintaining the access control in a non-actuated position.

15. The computer product of claim 10, wherein the operations further comprise:

identifying access levels proximate a vertical top portion of each of the one or more hierarchies.

16. The computer product of claim 10, wherein the operations further comprise:

identifying groups of credentials that are assigned to one or more access levels proximate a vertical top portion of one or more hierarchies.

17. The computer product of claim 10, wherein the operations further comprise:

detecting usage of access controls at each of the one or more access levels for each of the one or more hierarchies; and recommending removal of access levels from a credential located proximate a vertical top portion each of the one or more hierarchies in response to usage by the credential.

18. The computer product of claim 10, wherein the operations further comprise:

recommending an access level proximate a vertical bottom portion of a hierarchy for a new credential.

\* \* \* \* \*